(12) United States Patent
Hoshino

(10) Patent No.: US 6,542,214 B1
(45) Date of Patent: Apr. 1, 2003

(54) REFLECTION COLOR LIQUID CRYSTAL DISPLAY

(75) Inventor: Koichi Hoshino, Omiya (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/019,320

(22) PCT Filed: Jul. 14, 2000

(86) PCT No.: PCT/JP00/04764
§ 371 (c)(1),
(2), (4) Date: Jan. 10, 2002

(87) PCT Pub. No.: WO01/06307
PCT Pub. Date: Jan. 25, 2001

(30) Foreign Application Priority Data

Jul. 16, 1999 (JP) ............................. 11-202653

(51) Int. Cl.[7] ............................. G02F 1/1333
(52) U.S. Cl. .................. 349/149; 249/151; 249/113
(58) Field of Search ................ 349/106, 149, 349/151; 379/113

(56) References Cited

U.S. PATENT DOCUMENTS 5,745,202 A * 4/1998 Yamauchi et al. .......... 349/110

FOREIGN PATENT DOCUMENTS

| JP | 62-35329 | 3/1987 |
|---|---|---|
| JP | 5-27224 | 2/1993 |
| JP | 5-289096 | 11/1993 |
| JP | 6-75115 | 3/1994 |
| JP | 6-75214 | 3/1994 |
| JP | 6-95156 | 4/1994 |
| JP | 10-319418 | 12/1998 |
| JP | 11-167107 | 6/1999 |

* cited by examiner

*Primary Examiner*—James Dudek
(74) *Attorney, Agent, or Firm*—Armstrong, Westerman & Hattori, LLP (57) ABSTRACT

An STN liquid crystal layer (8) is sandwiched between a first substrate (1) having first electrodes (6) and a second substrate (2) having second electrodes (7), a reflective layer (3) is formed over the entire first substrate (1), and a color filter (4) is provided on the reflective layer (3) to constitute a liquid crystal cell (10). A twisted retardation film (9), retardation films (11, 12) and a polarizing film (13) are arranged on the visible side of the second substrate (2). The second substrate (2) is larger than the first substrate (1). First electrode wiring patterns (26) extending to an area of the second substrate (2) outside the area superposed on the first substrate (1) are formed on a surface of the second substrate (2) provided with the second electrodes (7). Input patterns (28) are formed on the area of the second substrate (2), outside the first substrate (1). The first and second substrates (1, 2) are coupled with an anisotropic conductive seal (23) to electrically connect the first electrodes (6) and the wiring patterns (26). A liquid crystal driving IC (21) is mounted on the second substrate (2), and each input/output terminal thereof is electrically connected to the wiring pattern (26) and the input pattern (28) through an anisotropic conductive adhesive (30).

10 Claims, 5 Drawing Sheets

REFLECTION COLOR LIQUID CRYSTAL DISPLAY

TECHNICAL FIELD

The present invention relates to a reflection-type liquid crystal display device, more specifically, to a reflection-type color liquid crystal display device containing a color filter therein, capable of displaying in multiple colors.

BACKGROUND TECHNOLOGY

As a conventional reflection-type liquid crystal display device, a reflection-type liquid crystal display device of a monochrome display using a TN (twisted nematic) liquid crystal cell or an STN (super twisted nematic) liquid crystal cell, is mainly used.

For the growing demand of displaying in colors in recent years, however, reflection-type color liquid crystal display devices containing color filters therein have been vigorously developed.

The reflection-type liquid crystal display devices containing color filters therein are broadly classified into the following three types.

The first type is a reflection-type color liquid crystal display device using no polarizing films. There are several devices belonging to this type, one using Guest-Host liquid crystal in which a dichroic pigment or a black dye is mixed in a liquid crystal material to fill a liquid crystal cell with, another using polymer-dispersion liquid crystal in which a liquid crystal material is dispersed in a polymer, and so on. Since any one of them does not use a polarizing film, it is excellent in brightness but low in contrast, and thus it has not been realized for practical use yet.

The second type is a reflection-type color liquid crystal display device having a color filter provided in a liquid crystal cell of a typical monochrome liquid crystal display device using two polarizing films.

Since this type uses two polarizing films, it is excellent in contrast, but it has a disadvantage of a dark display as well as a problem that its chroma is not good because of occurrence of color mixture caused by a reflective layer provided outside its glass substrate.

The third type is a reflection-type color liquid crystal display device using one polarizing film and containing a reflective layer inside a liquid crystal cell.

This reflection-type color liquid crystal display device is excellent in chroma with little color mixture because light is reflected by an inner surface of the liquid crystal cell. Accordingly, the liquid crystal display devices of this type have been vigorously developed.

Figure 7:
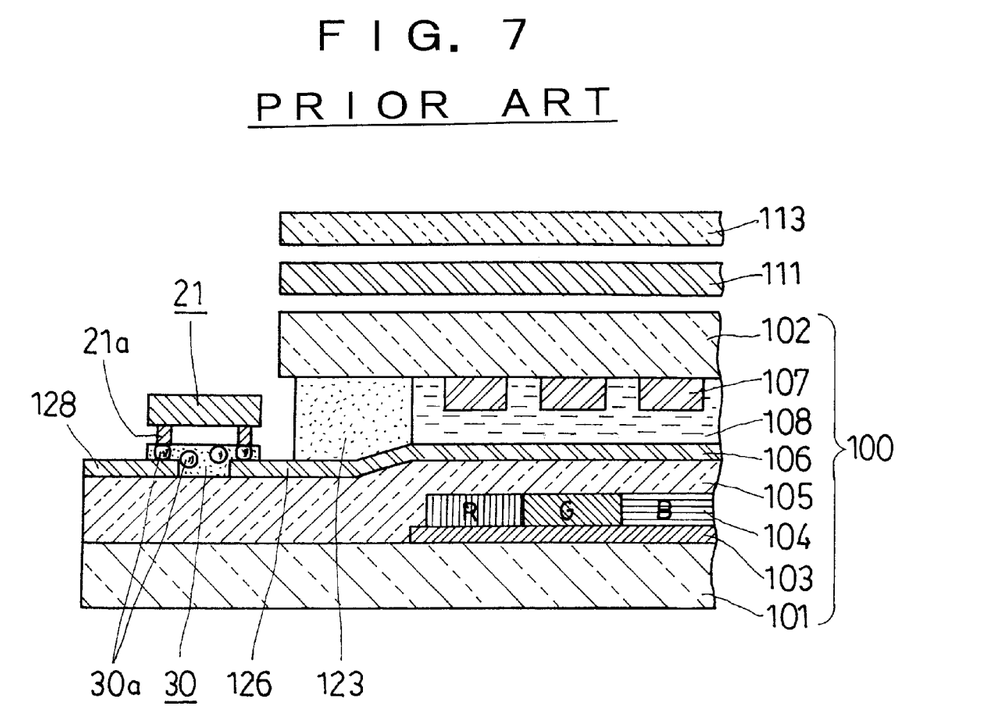
FIG. 7 is a schematic sectional view, similar to FIG. 2, showing an example of the conventional reflection-type color liquid crystal display device.

Hereinafter, the structure of the reflection-type color liquid crystal display device of this type will be briefly explained using FIG. 7. FIG. 7 is a schematic sectional view showing a part of the conventional reflection-type color liquid crystal display device considerably enlarged.

In this liquid crystal display device, a reflective layer 103 is first formed on a first substrate 101 which is a transparent glass substrate, and a color filter 104 composed of three color filters of red (R), green (G) and blue (B) is formed thereon. Further, a protective film 105 is formed on the color filter 104, and many first electrodes 106 in a stripe-shape are formed thereon. The first electrodes 106 are extended to form row side wiring patterns 126 and row side input patterns 128 simultaneously.

On the other hand, many second electrodes 107 in a stripe-shape are formed on the lower surface of the second substrate 102 which is a transparent glass substrate. The second electrodes 107 are extended to form column side wiring patterns (not shown) and column side input patterns (not shown) simultaneously.

The first substrate 101 and the second substrate 102 are opposed such that the first electrodes 106 and the second electrodes 107 are perpendicular to each other, and coupled to have a predetermined gap therebetween with a seal 123. Then, the gap between the two substrates 101 and 102 is filled with liquid crystal to form a liquid crystal layer 108.

Thereby, a liquid crystal cell 100 is constituted in which the (STN) liquid crystal layer 108 is sandwiched between the two transparent substrates 101 and 102.

Both the first electrodes 106 and the second electrodes 107 in the liquid crystal cell 100 are transparent electrodes made of indium tin oxide (ITO), and many electrodes are arranged side by side in directions perpendicular to each other to form pixels at respective intersections thereof. At a position corresponding to each pixel, each color filter of the color filter 104 is arranged in such an order of R, G, and B in both the directions perpendicular to each other.

Further, a row side driving IC 21 and a column side driving IC (not shown) are mounted, as liquid crystal driving ICs which are semiconductor integrated circuit devices (referred to as "IC"), at desired positions on the first substrate 101 and the second substrate 102 of this liquid crystal cell 100, respectively. This is referred to as a chip-on-glass.

In this event, protruding electrodes (bumps) 21a serving as input/output terminals of the row side driving IC 21 are aligned with and bonded to wires of the row side wiring patterns 126 and the row side input patterns 128 with an anisotropic conductive adhesive 30, and further the each protruding electrode 21a is electrically connected to each wire. As for the not shown column side driving IC, its each protruding electrode is similarly bonded to as well as electrically connected to each wire of the column side wiring patterns and the column side input patterns with an anisotropic conductive adhesive.

Finally, a retardation film 111 and a polarizing film 113 (absorption-type polarizing film) are provided outside the second substrate 102 to complete a liquid crystal display device.

However, the conventional reflection-type color liquid crystal display device configured as above has some problems described below.

First of all, since the reflective layer 103 needs to have a high reflectance, aluminum (Al) or silver (Ag) is used as its material. Both of them, however, have poor chemical resistance.

Therefore, in the case of using aluminum or silver as the reflective layer 103, it is necessary to form a film for protecting aluminum or silver on its top surface. In other words, it is necessary to use aluminum or silver together with the protective film on its top surface as the reflective layer 103.

Typically, a silicon oxide ($SiO_2$) film is formed as the protective film by a sputtering method or a vacuum evaporation method, and further the formation of the aluminum film or the silver film on the first substrate 101 and the formation of the silicon oxide film thereon are sequentially performed in order to prevent the reflectance from decreasing due to oxidation of the surface of the aluminum film or the silver film.

The silicon oxide film has good compatibility with the color filter 104 which is to be formed thereon, and thus the color filter 104 can stably be formed thereon.

However, when silicon oxide exists on aluminum or silver, it is very difficult to pattern the reflective layer 103 because silicon oxide has excellent chemical resistance.

As countermeasures against this problem, it can be considered that the aluminum film or the silver film and the silicon oxide film are formed on the entire surface of the first substrate 101 as the reflective layer 103.

This eliminates the need to pattern the reflective layer 103. This makes it impossible, however, to observe the row side wiring patterns 126 and the row side input patterns 128 from the outside of the first substrate 101 because the reflective layer 103 is opaque.

Further, it is also impossible to observe the row side wiring patterns 126 and the row side input patterns 128 through the row side driving IC 21 because the row side driving IC 21 and the column side driving IC, which are semiconductor integrated circuit devices made of silicon, are opaque.

For this reason, it becomes impossible to align the protruding electrodes 21a on the lower surface of the row side driving IC 21 with the row side wiring patterns 126 and the row side input patterns 128. As a result, accurate electrical connection between the row side driving IC 21 and the row side wiring patterns and the row side input patterns can not be established, which makes it impossible to constitute a liquid crystal display device.

It is an object of the invention to solve these problems and to stably provide a reflection-type color liquid crystal device which is bright and excellent in chroma and has sufficient chemical resistance.

DISCLOSURE OF THE INVENTION

The reflection-type color liquid crystal display device according to the invention is a reflection-type color liquid crystal display device comprising: a liquid crystal cell including an STN liquid crystal layer composed of nematic liquid crystal which is aligned at a twist angle range of 180° to 270° sandwiched between a transparent first substrate having first electrodes and a transparent second substrate having second electrodes, and provided with a reflective layer on the first substrate, and a color filter of a plurality of colors on at least one of the first and second substrates; a polarizing film provided on a visible side of the second substrate; a retardation film provided between the polarizing film and the second substrate; and a liquid crystal driving integrated circuit for driving the liquid crystal cell, and the reflection-type color liquid crystal display device is configured as follows to attain the aforementioned object.

The second substrate is larger than the first substrate, and the reflective layer is provided on the entire surface of the first substrate. Further, wiring patterns for the first electrodes extending to an area of the second substrate outside an area of the second substrate superposed on the first substrate and input patterns for the liquid crystal driving integrated circuit on the area of the second substrate outside the first substrate, are provided on a surface of the second substrate provided with the second electrodes.

Furthermore, the first substrate and the second substrate are coupled with an anisotropic conductive seal having anisotropy in a direction of electrical conduction, and the first electrodes are electrically connected with the wiring patterns for the first electrodes through the anisotropic conductive seal.

Moreover, the liquid crystal driving integrated circuit is mounted on the second substrate, and input/output terminals of the liquid crystal driving integrated circuit are electrically connected to the wiring patterns and the input patterns through an anisotropic conductive adhesive, respectively.

It is preferable to provide the color filter on the first substrate.

Further, the second substrate is preferably thinner than the first substrate in thickness.

Furthermore, the retardation film may be composed of a twisted retardation film, a first retardation film, and a second retardation film which are sequentially arranged from the second substrate side to the polarizing film side.

In the reflection-type color liquid crystal display device according to the invention, the reflective layer is formed on the entire surface of one of the substrates. Therefore, the reflective layer does not need to be patterned at all.

As a result, the reflective layer having excellent chemical resistance can easily be formed by forming a silicon oxide ($SiO_2$) film having excellent chemical resistance on an aluminum film or a silver film having an excellent reflectance but poor chemical resistance.

Moreover, the two substrates are coupled using the anisotropic conductive seal, which makes it possible that the electrodes on the substrate formed with the reflective layer are electrically connected to wires of the wiring patterns formed on the opposite substrate, and that all the liquid crystal driving ICs for driving the liquid crystal cell are mounted on a substrate without reflective layer.

Since the liquid crystal driving ICs are mounted on the substrate without reflective layer, the opaque reflective layer, even if existing on the entire surface of the substrate, is not an obstacle to alignment of positions of the input/output terminals of the liquid crystal driving ICs and the wiring patterns, which enables the alignment by viewing them from the outside of the substrate without reflective layer.

BEST MODE FOR CARRYING OUT THE INVENTION

The preferred embodiment of a reflection-type color liquid crystal display device in which the present invention is carried out will be described hereinafter using the accompanying drawings.

Figure 1:
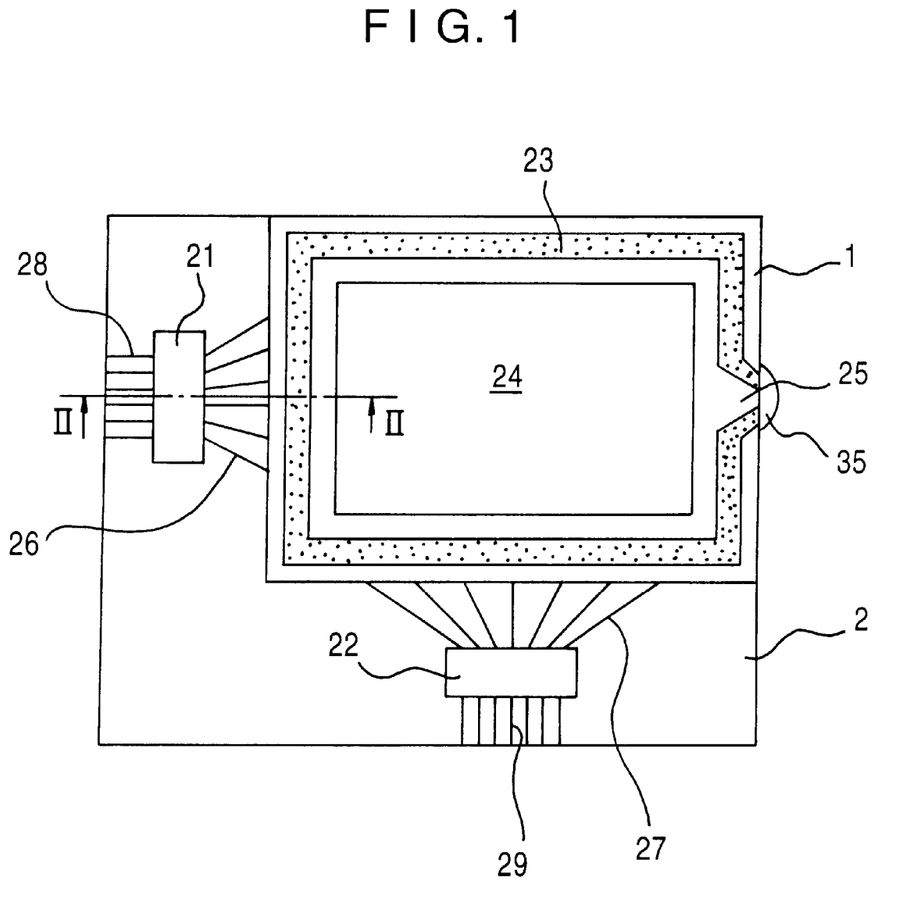
FIG. 1 is a diagrammatic plane view of an embodiment of a reflection-type color liquid crystal display device according to the invention, viewed from the opposite side to the visible side.
Figure 2:
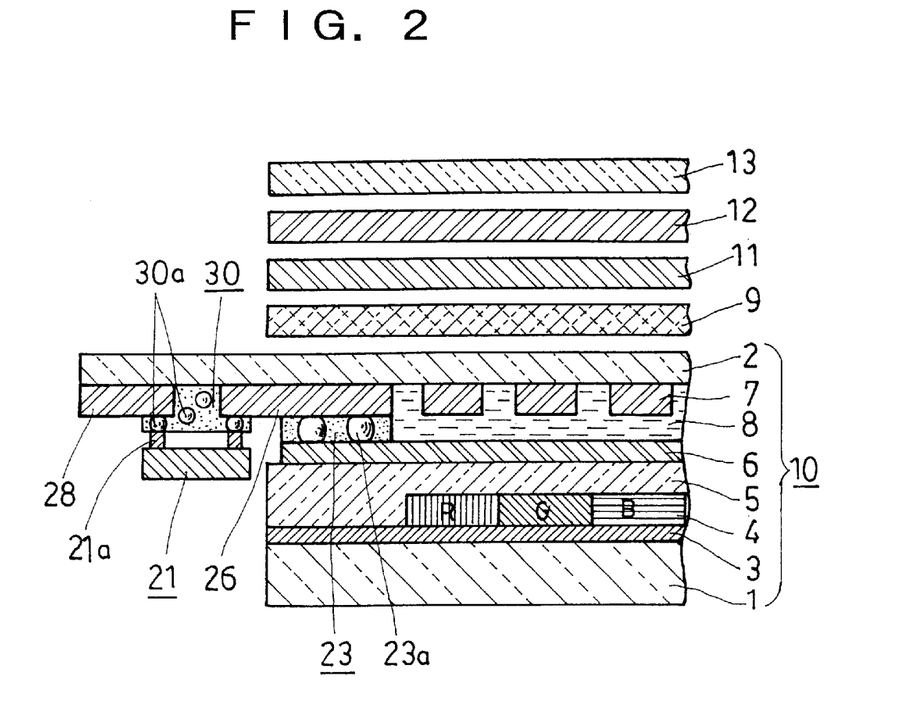
FIG. 2 is a schematic sectional view showing a considerably enlarged cross section taken along the II—II line in FIG. 1.

FIG. 1 is a diagrammatic plane view of an embodiment of the reflection-type color liquid crystal display device according to the invention, viewed from the opposite side (a rear surface side) to the visible side. FIG. 2 is a schematic sectional view showing a considerably enlarged cross section, which is taken along the II—II line in FIG. 1, with its visible side facing upward.

In this reflection-type color liquid crystal display device, as mainly shown in FIG. 2, a liquid crystal cell 10 is constituted of a first substrate 1 formed with a reflective layer 3, a color filter 4, a protective film 5 and first electrodes 6 on its inner surface, a second substrate 2 formed with second electrodes 7 on its inner surface, an anisotropic conductive seal 23 bonding the first substrate 1 and second substrate 2 together with a desired gap interposed therebetween, and a liquid crystal layer 8 sandwiched between the first substrate 1 and the second substrate 2.

Further, on the visible side (the upper side in FIG. 2) of the second substrate 2 of the liquid crystal cell 10, a twisted retardation film 9, a first retardation film 11, a second retardation film 12, and a polarizing film 13 are arranged in sequence. Furthermore, a row side driving IC 21 and a column side driving IC 22 are bonded to the top of the second substrate 2 as shown in FIG. 1.

The first substrate 1 is made of a glass plate with a thickness of 0.7 mm. As the reflective layer 3, a material having a higher reflectance is suitable. Aluminum (Al) and silver (Ag) are regarded as the material having a higher reflectance, in which silver is slightly higher than aluminum in reflectance but more difficult than aluminum in usability because the reflectance of silver greatly decreases due to oxidation. Meanwhile, aluminum easily melts even in a weak acid, and thus it has poor resistance to chemicals during process by itself.

For this reason, in this embodiment, an aluminum film is first formed as the reflective layer 3 on the entire surface of the first substrate 1, and further a silicon oxide film is formed on the entire surface of the aluminum, so that the reflective layer 3 is made sufficiently resistant to chemicals during the process while maintaining a high reflectance.

The aluminum film is formed to have a thickness of about 100 nm by a sputtering method, and the silicon oxide film is formed to have a thickness of about 30 nm also by the sputtering method.

Although the aluminum film and the silicon oxide film are formed sequentially in order to prevent the reflectance from decreasing due to oxidation of the surface of the aluminum, they may be formed separately if the decrease in reflectance can be prevented.

The method for forming the films is not limited to the sputtering method, but the films can be formed by another method, for example, a vacuum evaporation method or the like.

Further, the color filter 4 consisting of three color filters of red (R), green (G) and blue (B) with a thickness of 0.8 μm is formed on the reflective layer 3 by a pigment dispersion method, and the protective film 5 with a thickness of 2 μm made of an acrylic material is formed on the entire top surface of the color filter 4. Then, transparent electrodes made of indium tin oxide (hereinafter, abbreviated to "ITO") are formed as the first electrodes 6 on the protective film 5 in a pattern of many stripes extending in the lateral direction in FIG. 2 and arranged side by side at fixed intervals in a direction perpendicular to the paper surface.

The second substrate 2 is made of a glass plate with a thickness of 0.4 mm. Transparent electrodes made of ITO are formed as the second electrodes 7 on a surface of the second substrate 2 facing the first substrate 1 in a pattern of many stripes extending in the direction perpendicular to the paper surface in FIG. 2 and arranged side by side at fixed intervals in the lateral direction.

As shown in FIG. 1, the second substrate 2 is larger than the first substrate 1 and extends off the first substrate 1 in two directions perpendicular to each other in a plane view. On the second substrate 2, in addition to the second electrodes 7 (column side pixel electrode patterns provided within an image display region), row side wiring patterns 26 (wiring patterns for the first electrodes 6) and column side wiring patterns 27 (wiring patterns for the second electrodes 7), which respectively extend to a region of the second substrate 2 outside an area of the second substrate superposed on the first substrate 1, are formed of the same ITO film as the second electrodes 7, and further row side input patterns 28 and column side input patterns 29 are formed only on a portion outside the first substrate 1.

The first substrate 1 and the second substrate 2 are coupled with the anisotropic conductive seal 23 which is provided along the periphery of the first substrate 1 in such a manner to have a gap between the two substrates of about 5 μm. The anisotropic conductive seal 23 is made by mixing conductive particles 23a, which are particles having conductive properties, in a sealing material having an adhesive force.

By coupling the substrates in such a manner that each first electrode 6 on the first substrate 1 are aligned with each wire of the row side wiring patterns 26 on the second substrate 2, and via the conductive particles 23a in the anisotropic conductive seal 23, many first electrodes 6 are electrically connected with the wires of the row side wiring patterns 26, respectively.

A liquid crystal is injected by vacuum into between the bonded first substrate 1 and the second substrate 2 from a liquid crystal inlet 25 shown in FIG. 1 and aligned at a twist angle of 240°, and then the inlet 25 is closed with a closing member 35 to form the super twisted nematic (STN) liquid crystal layer 8 sandwiched therebetween.

In order to perform an image display, the row side driving IC 21 serving as a liquid crystal driving IC, which is a semiconductor integrated circuit, is mounted on the second substrate 2 in such a manner that each protruding electrode 21a serving as input/output terminal is aligned with each wire of the row side wiring patterns 26 and the row side input patterns 28 and bonded to the second substrate 2 with an anisotropic conductive adhesive 30, so that the protruding electrodes are electrically connected to the wires of the row side wiring patterns 26 and the row side input patterns 28 via conductive particles 30a in the anisotropic conductive adhesive 30.

Further, the column side driving IC 22 is similarly mounted on the second substrate 2 and bonded thereto with the anisotropic conductive adhesive 30, so that each protruding electrode thereof is electrically connected to the each wire of the column side wiring patterns 27 and the column side input patterns 29 via conductive particles in the anisotropic conductive adhesive 30.

The anisotropic conductive adhesive 30 is made by mixing the conductive particles 30a, which are particles having conductive properties, in a film having an adhesive force.

Figure 3:
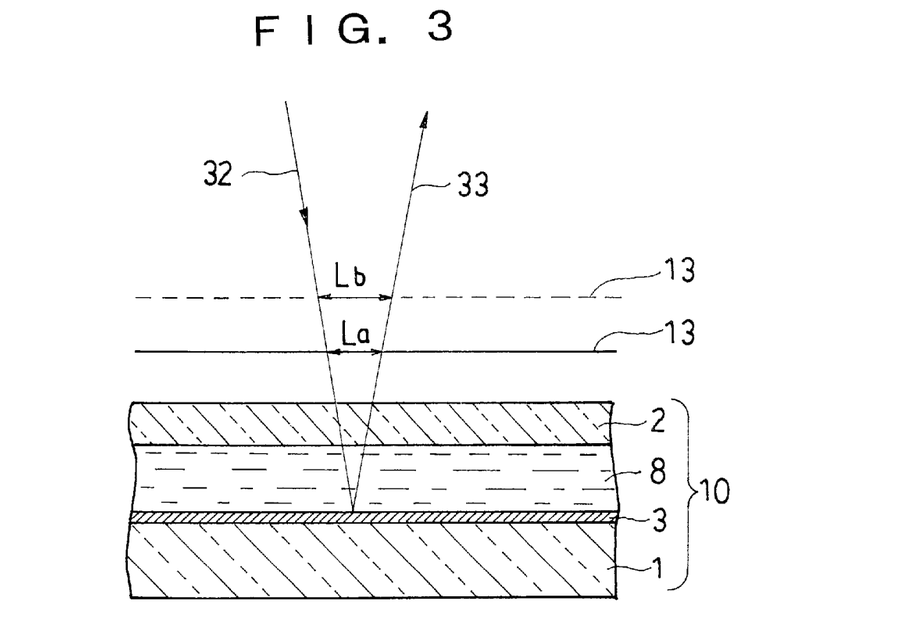
FIG. 3 is a view for explaining the relationship between the distance between a polarizing film and a reflective layer and the display quality in the reflection-type color liquid crystal display device shown in FIGS. 1 and 2.

Here, the thickness of the second substrate 2 is explained using FIG. 3. It should be noted that in FIG. 3, only parts of the liquid crystal cell 10 and the polarizing film 13 shown in FIG. 2 are simply shown, and illustration of the color filter 4, the protective film 5, and the first and second electrodes 6 and 7 and the like is omitted.

Incident light 32 shown in FIG. 3 is reflected by the reflective layer 3 provided on the inner surface of the first substrate 1 to be reflected light 33 and reaches the observer's eye. On the visible side (the upper side in FIG. 3) of the second substrate 2, the polarizing film 13 is provided to serve as a polarizer and an analyzer.

When the second substrate 2 is thick, the polarizing film 13 is located at a position shown by a broken line. In this case, a distance between positions where the incident light 32 and the reflected light 33 pass through the polarizing film 13 respectively is Lb. When the second substrate 2 is made thin, the polarizing film 13 is located, for example, at a position shown by a solid line to be closer to the reflective layer 3. A distance between positions where the incident light 32 and the reflected light 33 pass through the polarizing film 13 respectively in this case is La (La<Lb).

The display quality becomes better as the positions where the incident light 32 and the reflected light 33 pass through the polarizing film 13 respectively are closer.

In other words, it is preferable to locate the polarizing film 13 as close to the reflective layer 3 as possible. Since the most important factor in determining the space between the polarizing film 13 and the reflective layer 3 is the thickness of the second substrate 2, the second substrate 2 is preferably made as thin as possible in order to obtain a better display quality.

However, as the second substrate 2 is made thinner, the strength thereof decreases. The second substrate 2 needs a thickness enough to keep a sufficient strength not to break in the processing steps.

In the above-described embodiment, the second substrate 2 does not need a strength as high as that of the first substrate 1 because the second substrate 2 is formed only with the second electrodes 7, the wiring patterns 26 and 27, and the input patterns 28 and 29.

Therefore, in consideration of the display quality and the strength in the processing steps, a glass plate having a thickness of 0.4 mm is used as the second substrate 2. This results in a better display quality.

On the other hand, the first substrate 1 is, as compared to the second substrate 2, subjected to many film forming processing steps and color filter forming steps. Accordingly, the first substrate 1 requires a strength higher than that of the second substrate 2 not to produce breakage and the like in the processing steps.

The thickness of the first substrate 1 has no influence on the display quality at all. Therefore, a glass plate with a thickness of 0.7 mm is used for the first substrate 1 so as to keep sufficient strength.

Finally, as shown in FIG. 2, the twisted retardation film 9, the first retardation film 11, the second retardation film 12, and the polarizing film 13 are arranged in sequence on the visible side (the upper side in FIG. 2) of the second substrate 2 of the liquid crystal cell 10 to constitute the reflection-type color liquid crystal display device.

The twisted retardation film 9, the first retardation film 11, the second retardation film 12, and the polarizing film 13 are bonded together into one piece with an acryl-based adhesive, and they are also bonded to the second substrate 2 with the acryl-based adhesive.

The twisted retardation film 9 is a film made by applying a liquid crystal polymer having a twisted structure, after an aligning treatment, to triacetyl cellulose (TAC) film or polyethylene terephthalate (PET) film, bringing it into a liquid crystal state at a high temperature of about 150° C., and cooling it rapidly to room temperature after adjusting the twist angle to fix the twisted state.

The first retardation film 11 and the second retardation film 12 are films made of, for example, stretched polycarbonate and having a thickness of about 70 $\mu$m, and are so-called Z-type retardation films having the relations of nx>nz>ny, where nx is the refractive index in the stretching direction, ny is the refractive index in the direction orthogonal thereto, and nz is the refractive index in the thickness direction.

The Z-type retardation film has little variation in retardation value even if seen from a tilting viewing angle, and consequently, the viewing angle characteristics of the liquid crystal display device can be improved.

The polarizing film 13 is an absorption-type polarizing film which transmits the linearly polarized light in a direction parallel to the light transmission axis thereof, and absorbs the linearly polarized light in a direction parallel to the light absorption axis that is orthogonal to the light transmission axis.

Figure 4:
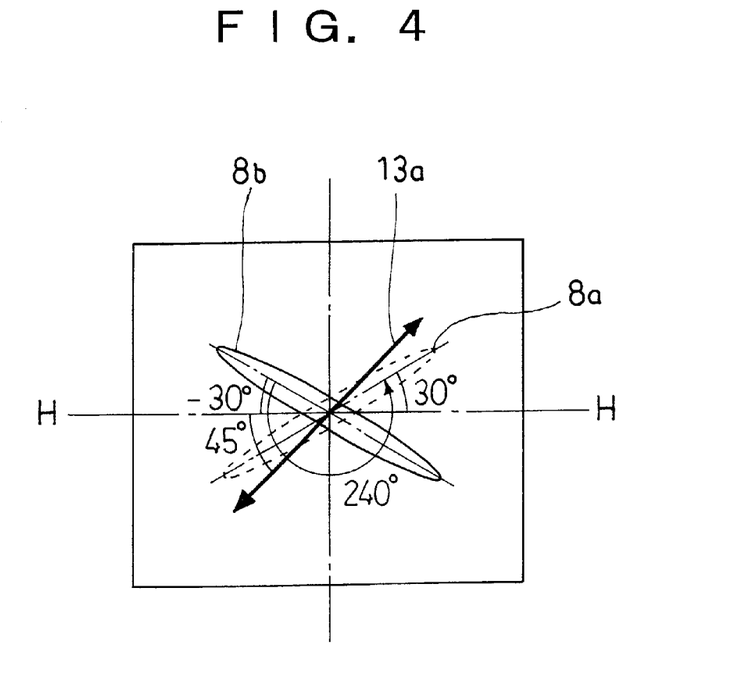
FIG. 4 is an explanatory view showing the planar arrangement relationship between a liquid crystal layer and the polarizing film in the same reflection-type color liquid crystal display device.
Figure 5:
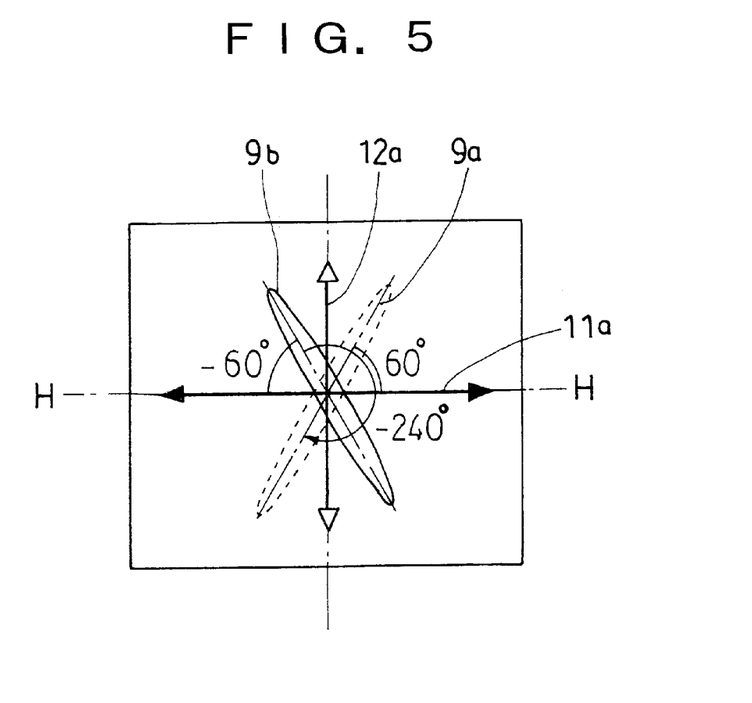
FIG. 5 is an explanatory view showing the planar arrangement relationship between a twisted retardation film, first and second retardation films of the same.

Here, the planar arrangement relationship between the liquid crystal layer 8, the twisted retardation film 9, the first retardation film 11, the second retardation film 12, and the polarizing film 13 is explained using FIG. 4 and FIG. 5. It should be noted that description of rotation angles in FIG. 4 and FIG. 5 is made assuming that an angle in the counterclockwise direction is plus and an angle in the clockwise direction is minus.

In the STN liquid crystal layer 8 of the liquid crystal cell 10, as shown in FIG. 4, a lower molecular alignment direction 8a of liquid crystal twists 30° in the counterclockwise direction with respect to the horizontal axis H-H, and an upper molecular alignment direction 8b of liquid crystal twists 30° in the clockwise direction with respect to the horizontal axis H-H. Accordingly, the twist angle of the nematic liquid crystal in the liquid crystal layer 8 is 240° in the counterclockwise direction.

The polarizing film 13 is arranged such that its light transmission axis 13a is at a 45° angle in the counterclockwise direction with respect to the horizontal axis H-H.

The twisted retardation film 9 is arranged such that its inner surface side molecular alignment direction 9a twists 60° in the counterclockwise direction with respect to the horizontal axis H-H, and an outer surface side molecular alignment direction 9b twists 60° in the clockwise direction to form a twist angle Tc of 240° in the clockwise direction as shown in FIG. 5.

The first retardation film 11 is arranged such that its retardation axis 11a is horizontal, and the second retardation film 12 is arranged such that its retardation axis 12a is vertical as shown in FIG. 5.

Next, the first electrodes 6 provided on the first substrate 1 and the second electrodes 7 provided on the second substrate 2 are explained.

In an image display region 24 shown in FIG. 1, the first electrodes 6 are patterned into a stripe-shape long in the lateral direction and arranged in the longitudinal direction. The second electrodes 7 are patterned in a stripe-shape long in the longitudinal direction and arranged in the lateral direction.

Each portion where the first electrode 6 and the second electrode 7 intersect (overlap) each other forms a pixel, and the pixels are arranged in a matrix (in rows and columns).

At a position corresponding to each pixel, each color filter of the color filter 4 is arranged in such an order of R, G, and B in both the directions perpendicular to each other.

Additionally, as described above, the input/output terminals (protruding electrodes) of the row side driving IC 21 and the column side driving IC 22; the row side wiring patterns 26 and the column side wiring patterns 27 for respectively connecting to the first electrode 6 and the second electrodes 7 in the stripe-shape which are provided within the image display region 24; and the row side input patterns 28 and the column side input patterns 29 for supplying signals from the outside to the row side driving IC 21 and the column side driving IC 22 respectively, are formed of the same ITO film as the second electrodes 7, on the lower surface of the second substrate 2.

In order to couple the first substrate 1 and the second substrate 2, the anisotropic conductive seal 23 in which the conductive particles 23a with a diameter of 6 μm are mixed in an epoxy sealant, is used. The use of the anisotropic conductive seal can give insulating properties in a plane direction and conductive properties in a thickness direction.

Furthermore, the row side wiring patterns 26 formed on the second substrate 2 together with the second electrodes 7 are formed in such a manner to overlap the first electrodes 6 on the first substrate 1 at a portion where the anisotropic conductive seal 23 is provided. This allows each first electrode to electrically connect with each wire of the row side wiring pattern 26 via the conductive particles 23a in the anisotropic conductive seal 23.

Consequently, the voltage generated in the row side driving IC 21 is transmitted via the anisotropic conductive adhesive 30, each wire of the row side wiring pattern 26, and the anisotropic conductive seal 23 to each first electrode 6 within the image display region 24.

The row side driving IC 21 is provided with many protruding electrodes 21a as the input/output terminals for inputting/outputting voltage respectively. The row side driving IC 21 is bonded to the second substrate 2 using the anisotropic conductive adhesive 30 such that the protruding electrodes 21a align with the row side wiring patterns 26 and the row side input patterns 28 formed on the second substrate 2. The column side driving IC 22 is the same as above.

As the anisotropic conductive adhesive 30 is a film, in which minute conductive particles 30a are mixed in a thermosetting adhesive tape, and P-8430IQ (trade name) which is an anisotropic conductive film manufactured by Sony Chemicals is used in this embodiment.

In order to perform a display as bright as possible, an ITO film with a sheet resistance of 100 ohms is formed on the first substrate 1 as the first electrodes 6.

On the other hand, it is more desirable if the ITO film of the second electrodes 7 formed on the second substrate 2 is also thin. However, unless the wiring resistances of the row side wiring pattern 26 and the column side wiring pattern 27 are sufficiently low, there occur a cross talk and the like, which makes it difficult to perform an excellent image display. For this reason, an ITO film with a sheet resistance of 30 ohms is formed as the second electrodes 7 and the like.

In the reflection-type color liquid crystal display device, the reflective layer 3 is preferably formed on the entire surface of the first substrate 1 as described above. Accordingly, the reflective layer 3 does not need to be patterned, which enables easy formation of the reflective layer 3 having a high reflectance and excellent chemical resistance.

Further, it becomes possible to couple the two substrates 1 and 2 together using the anisotropic conductive seal 23, and to electrically connect the first electrodes on the first substrate 1 to the row side wiring patterns 26 on the second substrate 2 respectively via the conductive particles 23a in the anisotropic conductive seal 23, so that the row side driving IC 21 and the column side driving IC 22 serving as liquid crystal driving ICs can be put collectively on a portion of the second substrate 2 outside the first substrate 1 where no reflective layer is provided.

As a result, the opaque reflective layer 3, even if existing on the entire surface of the first substrate 1, is not an obstacle to alignment of the protruding electrodes and the wiring patterns when the liquid crystal driving ICs are mounted, so that the liquid crystal driving ICs can be mounted at desired positions to stably provide the reflection-type color liquid crystal display device.

Next, the transmittance characteristics of the color filter used in this embodiment are explained with reference to FIG. 6.

Figure 6:
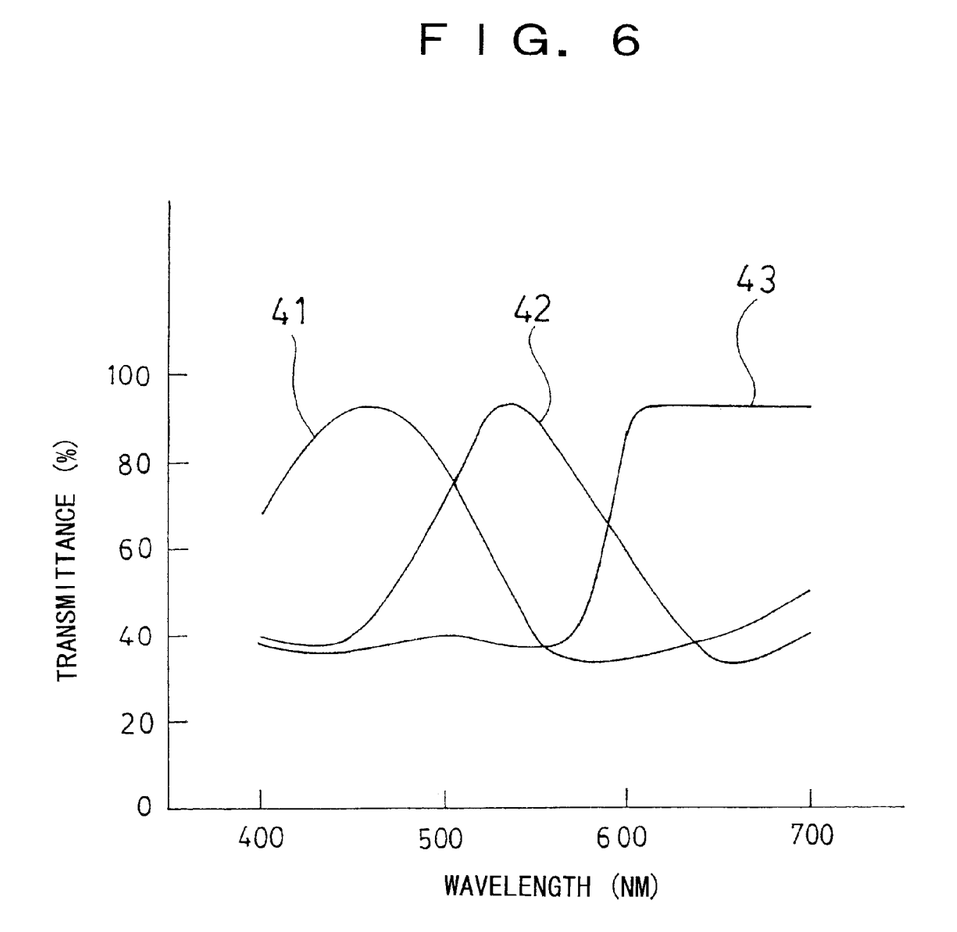
FIG. 6 is a diagram showing characteristics of a color filter used in the same reflection-type color liquid crystal display device.

In FIG. 6, the horizontal axis represents the wavelength of light (nm) and the vertical axis the transmittance (%) respectively, and curved lines 41, 42 and 43 show the transmittances of the blue (B), green (G) and red (R) color filters constituting the color filter 4 respectively.

The color filter 4 is preferably as high in maximum transmittance as possible to improve brightness, and thus the color filter 4 is made thin in thickness or the concentration of pigments is reduced. However, if the thickness is made too thin or the concentration of pigments is reduced too much, the minimum transmittance is 50% or more, that is, the chroma of the color filter 4 is extremely lowered.

Prototypes with color filters having various thicknesses were tested, and it is consequently found that the maximum transmittance of each color filter is preferably 80% or more and most preferably 90% or more as in the example shown in FIG. 6.

On the other hand, the minimum transmittance of each color filter is preferably between 30% and 50%, and most preferably about 40% as in the example shown in FIG. 6, giving priority to chroma and brightness.

Incidentally, the substrate on which the color filter 4 is formed needs a process longer than that of the substrate on which the color filter 4 is not formed. Therefore, it is easy and stable to form the color filter 4 on the thick first substrate 1 having sufficient strength. For this reason, the color filter 4 is formed on the first substrate 1 in this embodiment.

However, that is not an essential condition for this invention, but it is possible that the color filter is formed on the second substrate 2 side or color filters are formed on both the substrates 1 and 2 in some cases.

Moreover, though the color filter consisting of three colors of red (R), green (G) and blue (B) is formed in this embodiment, a color filter consisting of three colors of magenta (M), cyan (C) and yellow (Y), or a color filter consisting of two color filters or four or more color filters can also be employed in accordance with uses.

Furthermore, the material and size of each portion in the above-described embodiment are one example, and thus the present invention is not limited to them, and as a matter of course, various changes may be made within meeting the requirements of the invention.

For instance, the twist angle of the nematic liquid crystal of the STN liquid crystal layer 8 is not limited to 240° but it is preferably within 180° to 270°.

INDUSTRIAL APPLICABILITY

As is clear from the above description, according to the present invention, a reflection-type color liquid crystal display device capable of performing a color image display which is bright and excellent in chroma can be stably provided.

More specifically, in the reflection-type color liquid crystal display device, since the reflective layer may be formed on the entire surface of one of the substrates as described above, the reflective layer does not need to be patterned, which enables easy formation of the reflective layer having a high reflectance and excellent chemical resistance.

Moreover, the two substrates are coupled using the anisotropic conductive seal, and the first electrodes on one substrate are electrically connected to the wiring patterns on the other substrate respectively via the anisotropic conductive seal, so that the liquid crystal driving ICs can be mounted collectively on the portion of the other substrate outside the one substrate where no reflective layer is provided.

As a result, the opaque reflective layer, even if existing on the entire surface of the one substrate, is not an obstacle to alignment of the input/output terminals (protruding electrodes) and the wiring patterns when the liquid crystal driving ICs are mounted, so that the liquid crystal driving ICs can securely be mounted at desired positions to stably provide the reflection-type color liquid crystal display device.

Further, as in the above-described embodiment, thick and thin substrates are used as the first and second substrates, the reflective layer and the color filter are formed on the entire surface of the thick substrate, and the thin substrate is used for the substrate on the visible side (the side on which the polarizing film is provided) of the liquid crystal cell to allow the polarizing film to be located close to the reflective layer, which makes it possible to obtain high chroma with little smear due to influence of adjacent pixels, resulting in improved display quality.

The reflection-type color liquid crystal display device according to the invention can be used as a display device of a wide range of apparatuses including various kinds of portable electronic devices such as cellular phones, personal digital assistants, wristwatches, mobile game machines, and the like.

What is claimed is:

1. A reflection-type color liquid crystal display device, comprising:

a liquid crystal cell including an STN liquid crystal layer composed of nematic liquid crystal which is aligned at a twist angle range of 180° to 270° sandwiched between a transparent first substrate having first electrodes and a transparent second substrate having second electrodes, and provided with a reflective layer on said first substrate, and a color filter on at least one of said first and second substrates;

a polarizing film provided on a visible side of said second substrate;

a retardation film provided between said polarizing film and said second substrate; and a liquid crystal driving integrated circuit for driving said liquid crystal cell, wherein said second substrate is larger than said first substrate, said reflective layer is formed on an entire surface on a liquid crystal layer side of said first substrate without performing patterning, wiring patterns for said first electrodes extending to an area of said second substrate outside an area of said second substrate superposed on said first substrate and input patterns for said liquid crystal driving integrated circuit on an area of the second substrate outside said first substrate, are provided on a surface of said second substrate provided with said second electrodes, said first substrate and said second substrate are coupled with an anisotropic conductive seal having anisotropy in a direction of electrical conduction, said first electrodes are electrically connected with said wiring patterns for said first electrodes through said anisotropic conductive seal, and said liquid crystal driving integrated circuit is mounted on said second substrate, and input/output terminals thereof are electrically connected to said wiring patterns and said input patterns through an anisotropic conductive adhesive respectively.

2. A reflection-type color liquid crystal display device according to claim 1, wherein said color filter is provided on said first substrate.

3. A reflection-type color liquid crystal display device according to claim 1, wherein said second substrate is thinner than said first substrate in thickness.

4. A reflection-type color liquid crystal display device according to claim 2, wherein said second substrate is thinner than said first substrate in thickness.

5. A reflection-type color liquid crystal display device according to claim 1, wherein said reflective layer is constituted by forming a silicon oxide film on an aluminum film or a silver film.

6. A reflection-type color liquid crystal display device according to claim 2, wherein said reflective layer is constituted by forming a silicon oxide film on an aluminum film or a silver film.

7. A reflection-type color liquid crystal display device according to claim 3, wherein said reflective layer is constituted by forming a silicon oxide film on an aluminum film or a silver film.

8. A reflection-type color liquid crystal display device according to claim 1, wherein said retardation film is composed of a twisted retardation film, a first retardation film, and a second retardation film which are sequentially arranged from said second substrate side to said polarizing film side.

9. A reflection-type color liquid crystal display device according to claim 2, wherein said retardation film is composed of a twisted retardation film, a first retardation film, and a second retardation film which are sequentially arranged from said second substrate side to said polarizing film side.

10. A reflection-type color liquid crystal display device according to claim 3, wherein said retardation film is composed of a twisted retardation film, a first retardation film, and a second retardation film which are sequentially arranged from said second substrate side to said polarizing film side.

* * * * *